Oct. 4, 1938.　　　　C. J. LINKE　　　　2,132,306
APPARATUS FOR CONTROLLING OR INDICATING PHOTOGRAPHIC EXPOSURES
Filed Jan. 2, 1936　　　5 Sheets-Sheet 1

Inventor:
Conrad J. Linke
by his Attorneys
Howson & Howson

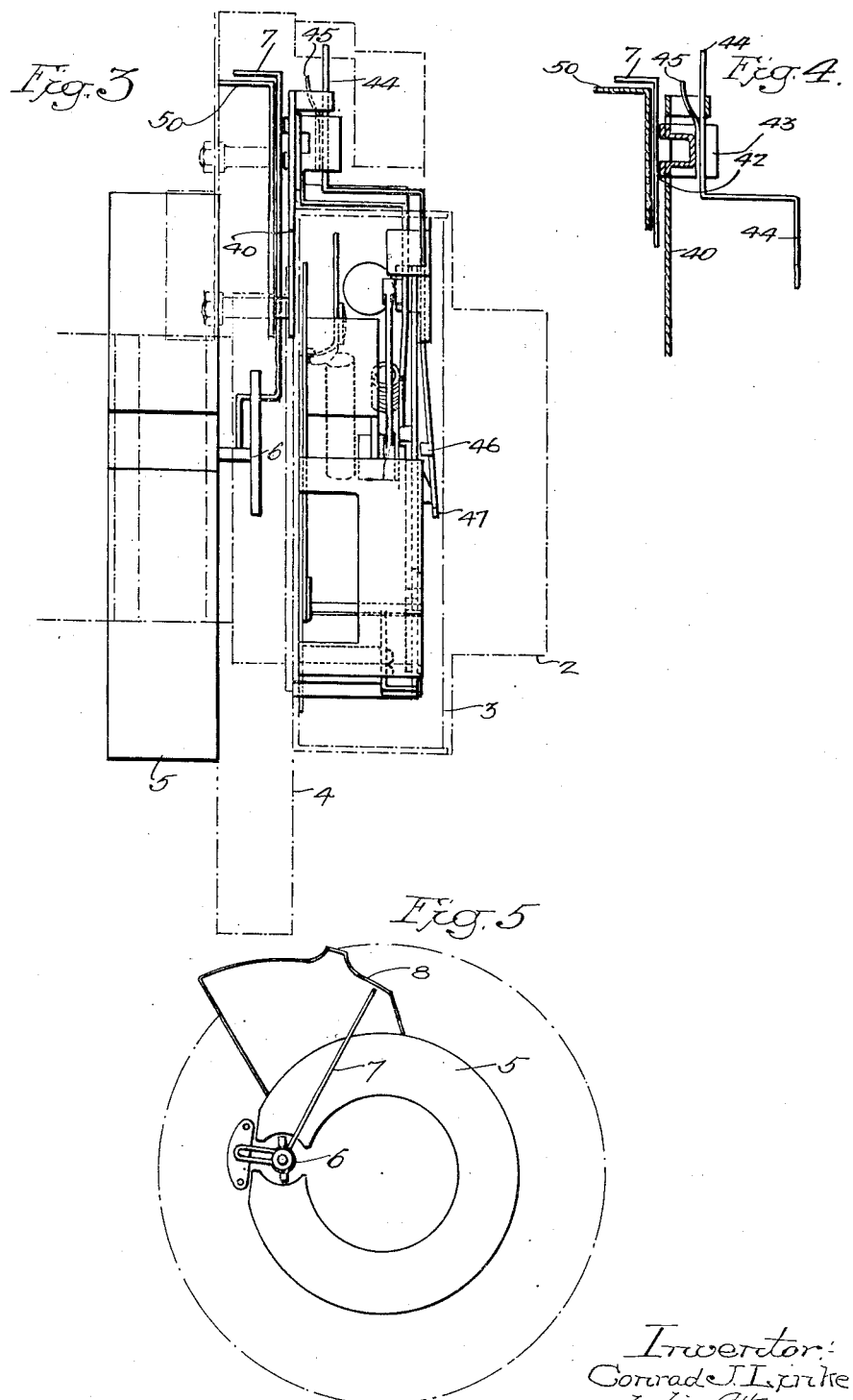

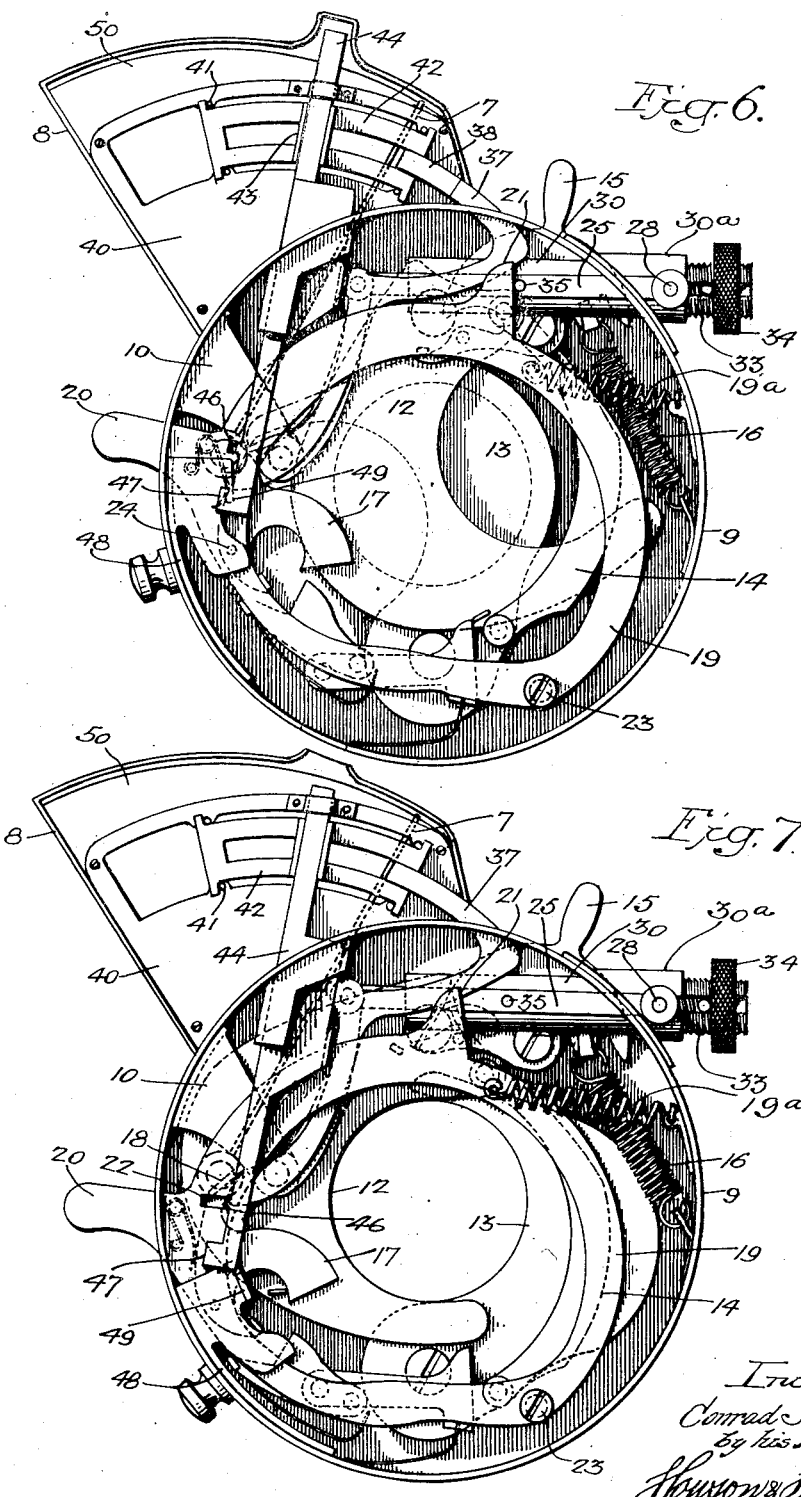

Oct. 4, 1938.  C. J. LINKE  2,132,306
APPARATUS FOR CONTROLLING OR INDICATING PHOTOGRAPHIC EXPOSURES
Filed Jan. 2, 1936  5 Sheets-Sheet 4
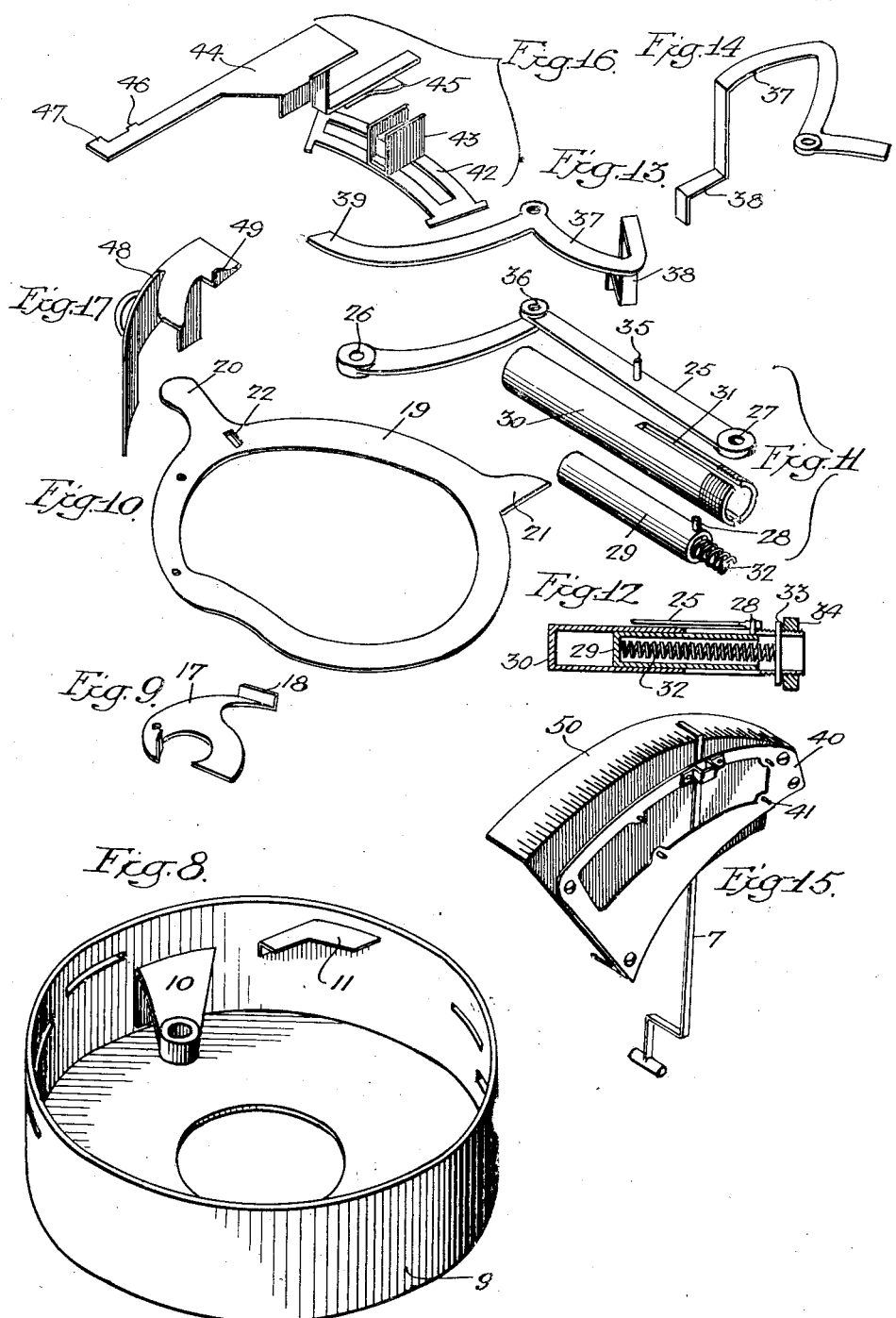
Inventor
Conrad J. Linke
by his Attorneys
Howson & Howson Oct. 4, 1938.   C. J. LINKE   2,132,306
APPARATUS FOR CONTROLLING OR INDICATING PHOTOGRAPHIC EXPOSURES
Filed Jan. 2, 1936   5 Sheets-Sheet 5

Inventor
Conrad J. Linke
by his Attorneys
Howson & Howson

Patented Oct. 4, 1938

2,132,306

UNITED STATES PATENT OFFICE 2,132,306

APPARATUS FOR CONTROLLING OR INDICATING PHOTOGRAPHIC EXPOSURES

Conrad J. Linke, Philadelphia, Pa.

Application January 2, 1936, Serial No. 57,271

10 Claims. (Cl. 95—63)

This invention relates to photographic apparatus and has for its principal object the provision of novel means whereby proper photographic exposure may be obtained. In accordance with one feature of the invention, the light-admission device, such as the shutter mechanism of the conventional camera, may be controlled automatically in accordance with the prevailing light conditions during instantaneous exposures. This is accomplished by the employment of a movable member whose position determines the actuation of the light-admission device, the said member being controlled by means responsive to the existing light conditions.

Another feature of the invention resides in the provision of means whereby the proper exposure is indicated by the said member for time exposures, the indication of said member in any instance being governed by said light-responsive means in accordance with prevailing light conditions.

A further feature of the invention resides in the provision of means whereby the light admitted to the said light-responsive means is controlled in accordance with the focus of the camera. By this feature, the exposure in any instance may be accurately controlled in accordance with the light conditions of the focused area.

Other objects and features of the invention will appear hereinafter.

In the accompanying drawings:

Fig. 3 is a side elevational view illustrating the mechanism of the device and showing the casing in phantom outline;

Fig. 4 is a fragmentary sectional view illustrating a detail of the device;

Fig. 5 is a detail view illustrating a part of the control device;

Fig. 6 is a front face view of the shutter mechanism in closed position and the controlling mechanism therefor;

Fig. 7 is a similar view showing the shutter mechanism in opened position;

Fig. 8 is a perspective view of the casing of the shutter mechanism;

Figs. 9 and 10 are perspective views of parts of the shutter mechanism;

Fig. 11 is an exploded view showing the parts of the adjustment device in perspective;

Fig. 12 is a sectional assembly view of the same device;

Figs. 13 and 14 are different perspective views of a part of the control device;

Fig. 15 is a perspective view of the controlling and indicating member and its associated scale;

Fig. 16 is an exploded view showing the parts of the brake in perspective;

Fig. 17 is a perspective view of another part of the shutter mechanism; and

In accordance with the present invention, a light-responsive device is cooperatively associated with the shutter mechanism or light-admission means of a camera in such manner that the light-responsive device controls the actuation of the shutter mechanism in accordance with the prevailing light conditions during instantaneous exposures and indicates the proper exposure for prevailing light conditions during time exposures. The light-responsive device comprises light-sensitive means adapted to generate an electrical potential whose magnitude depends upon the light received by said means. Such light-sensitive means may take the form of the well known "Photronic" cell which is capable of generating an electrical potential sufficient to move a needle or like element. Such a movable element is utilized, in accordance with the present invention, in a manner to control the shutter mechanism of a camera for instantaneous exposures and to indicate proper exposure times for time exposures.

Figure 1:
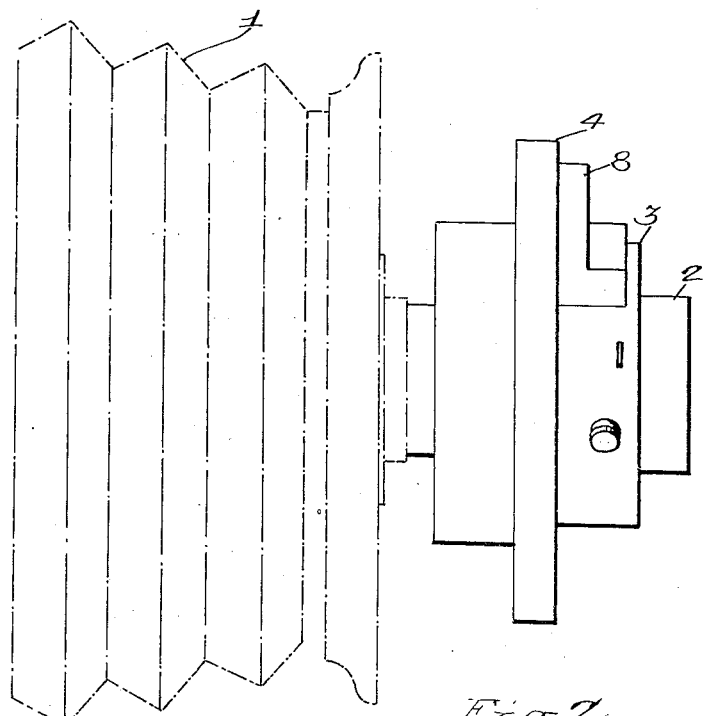
Fig. 1 is a side elevational view of a portion of a camera embodying the invention.
Figure 2:
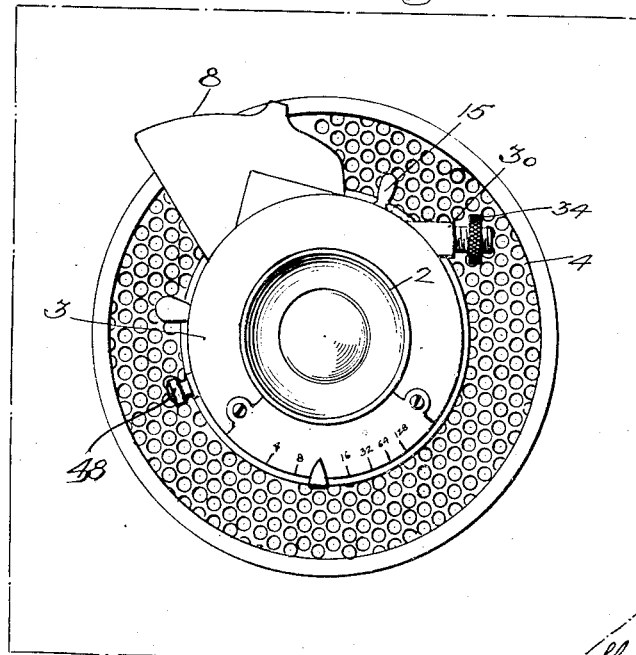
Fig. 2 is a front face view of the device.

Referring to Figs. 1 and 2, there is illustrated the front portion of a camera having the conventional bellows structure 1 and lens 2. As in the conventional camera, a light-admission shutter mechanism 3 is interposed between the bellows structure and the lens, but in accordance with the present invention, there is provided in cooperative relation with the shutter mechanism a control device including a light-responsive device 4, similar to the conventional "Photronic" cell, comprising a honeycomb structure as shown in Fig. 2. As in the conventional "Photronic" cell, the light enters the small openings and impinges upon a light-sensitive surface, thus effecting generation of a electric potential whose amplitude varies in accordance with the amount of light.

As shown in Figs. 3 and 5, there is provided an electrically operable device which is controlled by the electrical potential above mentioned. This device comprises a permanent magnet 5, a rotatable coil structure 6 cooperatively arranged with the magnet, as shown, and a needle 7 carried by the coil structure. It will be understood that the generated electrical potential is applied to the movable coil and actuates the needle 7 in a manner depending upon the light falling upon the light-responsive device 4. The needle 7 is arranged to move within a hood 8.

The assembly views of Figs. 3, 6 and 7 illustrate the combined shutter mechanism and control device therefor. In Fig. 6, the shutter mechanism is shown in closed condition, while in Fig. 7, it is shown in opened condition. Those parts of the device which differ from the parts of a conventional shutter mechanism are shown in Figs. 8 to 17.

The combined shutter mechanism and control device therefor comprises a casing 9 (see Fig. 8) carrying a bracket 10 and a guide plate 11 interiorly thereof and having apertures provided in its walls, the purpose of which will be clearly understood later. The illustrated shutter mechanism is typical of the conventional mechanism employing hinged or pivoted shutter elements and it is, therefore, unnecessary to describe the structure and operation of this mechanism in detail. As in the conventional device of this type, the device shown in Figs. 6 and 7 comprises pivoted shutter members 12 and 13 connected by a link 14 and having associated therewith a latching and actuating device 15 with an associated spring 16. The mechanism also comprises the usual latching device 17 which, in the present case, differs from the usual element in that there is provided a projection 18, as shown clearly in Fig. 9, the purpose of which will be understood later. As in the operation of the conventional shutter mechanism of this type, for instantaneous exposures, the latching device 15 is set in the position of Fig. 6 and when the mechanism is actuated, the shutter elements are moved to open position by the spring 16 and the device 15. The shutter mechanism is held in open position by the latching device 17. In accordance with the present invention, this latching open of the shutter elements is maintained during a time interval which is determined by the light conditions prevailing at the time of exposure.

In place of the actuating member which is conventionally employed in a shutter mechanism of this character, there is provided in the present case a ring 19 (see Fig. 10) having an extending actuating portion 20, a latching projection 21 and an aperture 22, the purpose of which will be explained later. The ring is pivotally attached to the casing 9 at 23 and, in turn, pivotally carries the latching device 17 at 24. The spring 19a urges the ring 19 to inoperative position.

In further accordance with the invention, an L-shaped arm 25 (see Fig. 11) has its end 26 pivotally attached to the bracket 10, while the opposite apertured end 27 of the L-shaped arm has seated therein a projecting pin 28 carried upon a plunger 29, the plunger being slidably mounted within a cylindrical housing 30 with the pin 28 slidably arranged in a slot 31, as shown in Fig. 12. The cylindrical housing 30 is supported by a shell 30a attached to the casing 9, as shown in Figs. 6 and 7. The cylinder 30 extends through the wall of the casing 9 with its ends protruding from the casing, as clearly shown. The plunger 29 carries a spring 32, which urges the plunger toward the left, as viewed in Figs. 6 and 7. The end of spring 32 has secured thereto a transverse pin 33 which is also seated in the opposed slots 31. An adjustable nut 34 threadedly attached to the open end of the cylindrical casing 30 acts as an adjustable abutment for the pin 33, enabling adjustment of the device, as will be more fully explained hereinafter.

The L-shaped arm 25 carries a pin 35 which normally abuts against the latching projection 21 of ring 19, so that the arm 25 is normally maintained in latched condition, as shown in Fig. 6. At 36, the arm 25 pivotally carries a lever 37 (see Figs. 13 and 14), whose end 38 is shaped for cooperative engagement with the needle 7. The other end 39 of lever 37 is adapted to engage projection 18 of the latching member 17, as will be explained more fully later.

Within the hood 8, there is provided a plate 40 (see Fig. 15) carrying pins 41 upon which there is movably mounted a slotted brake shoe 42 (see Fig. 16) having guide walls 43 within which there is seated a slidable brake arm 44. The brake arm also extends through a slot in the wall of casing 9 below the guide plate 11 (see Figs. 6 and 7). The brake arm is formed as clearly illustrated in Fig. 16 and is provided with a spring cam member 45, a depending projection 46 and a lateral projection 47. The spring cam 45 is positioned relative to the brake shoe 42 as clearly shown in Fig. 4 and is adapted to actuate the brake shoe when the brake arm is moved longitudinally. The depending projection 46 of the brake arm normally seats in the opening 22 of the ring 19. As in the conventional shutter mechanism, there is provided a slidable member 48 (see Fig. 17) which adapts the shutter mechanism for either instantaneous or time exposure. In the present case, this member 48 is provided with an up-turned cam flange 49 which is adapted to cooperate with the lateral projection 47 of the brake arm. Normally, the member 48 will be in such position that the cam 49 will have no effect upon the brake arm, but the member may be moved to such position that the cam will move the end of the brake arm outward so as to disengage it from the ring 19, thereby rendering the brake inoperative.

As shown clearly in Fig. 15, there is provided in cooperative relation with the needle 7 an indicating scale 50 which may be employed whenever a time exposure is desired. At such time, the brake will be rendered inoperative, although the needle will move over the scale 50 in accordance with the prevailing light conditions. The scale 50 may be calibrated so as to indicate the exposure times for various light conditions, as indicated by the position of the needle in any given instance.

The operation of the combined shutter mechanism and control device is as follows:—The needle 7 will, of course, assume a position dependent upon the prevailing light conditions. The shutter mechanism is actuated in the usual manner, in the present instance, the ring 19 being moved by means of its actuating projection 20. The slight movement of the ring 19 to effect actuation of the shutter mechanism moves the brake arm 44 so that the spring cam 45 presses against the brake shoe 42, urging the latter into firm engagement with the needle 7 and thus holding the needle in the position which it has assumed. The movement of ring 19 also releases the pin 35 so that the L-shaped arm 25 is free to move toward the left as viewed in Figs. 6 and 7. Therefore, the spring 32 urges the plunger 29 toward the left, thus actuating the arm 25. This movement is retarded by the trapped air in the cylindrical housing 30. The rate of movement of arm 25 is dependent upon the spring tension adjustment of the adjusting nut 34. As the arm 25 moves toward the left, it carries the pivoted lever 37 with it until the end 38 of the lever engages the needle 7, at which time, the lever 37 pivots about its pivot point and its free end 39 engages the projection 18 of the latching member 17. The shutter mechanism is thus released, allowing the shutter elements to close. When the ring 19 is permitted to return to its normal position, the brake arm is released and the L-shaped arm 25 is moved toward the right, carrying with it the lever 37. The parts are thus returned to their original position.

It will be seen that the length of time during which the shutter elements remain open is dependent upon the movement of the lever 37 before it strikes the needle. The length of this movement is, of course, dependent upon the position of the needle, as determined by the prevailing light conditions, while the rate of movement may be adjusted manually. It will be understood, of course, that when the rate of movement is once adjusted satisfactorily, the adjustment will not be varied unless it becomes necessary.

For time exposures, the member 48 may be adjusted so as to bring the cam 49 into cooperative engagement with the projection 47 of the brake arm, thus moving the brake arm at 46 out of engagement with the slot 22 of ring 19. The brake is thus rendered inoperative and the needle is free at all times. The shutter mechanism may then be operated manually to close the shutter elements after the proper interval of time, as indicated on the scale 50 by the position of the needle 7.

Figure 18:
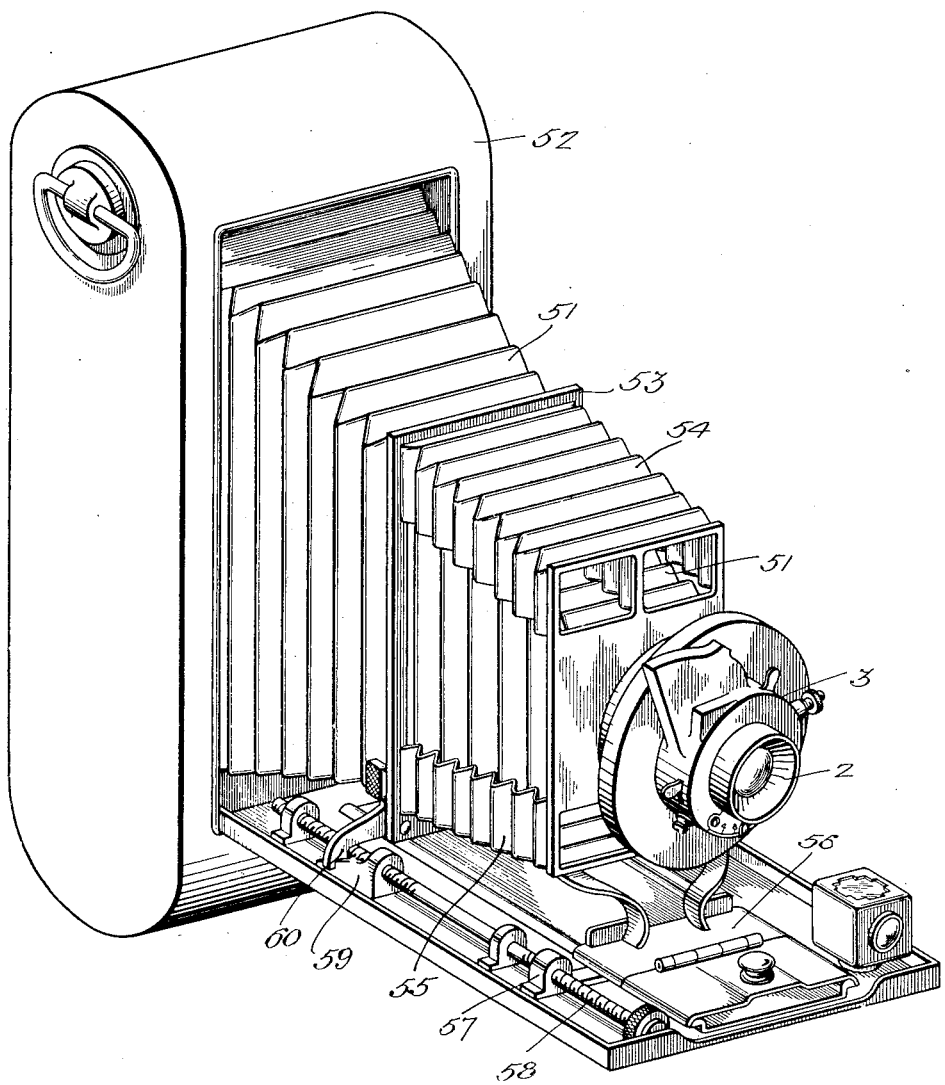
Fig. 18 is a perspective view of a camera embodying the several features of the invention and including a modification.

In Fig. 18, there is illustrated a complete camera embodying the specific form of the invention above described and also embodying an additional feature whereby the light admitted to the light-responsive device is controlled in accordance with the focus of the camera. The lens and the shutter mechanism are similar to the corresponding elements of the device above described and are similarly related to one another and, therefore, these elements have been designated by the same reference characters as those employed hereinbefore. The bellows 51 corresponds to the usual bellows and extends from the body 52 of the camera, which houses the film or photosensitive element, to the lens and shutter device. In accordance with the present invention, however, there is provided a member 53 intermediate the ends of the bellows 51, which member has light-sensitive surfaces above and below the bellows 51, and there are provided additional bellows structures 54 and 55 through which light is admitted to the light-sensitive surfaces. These surfaces, like the "Photronic" cell, generate an electrical potential in accordance with the light supplied to them, and the potential is utilized to actuate the needle of the shutter control device, as above described. The lens and shutter structure is supported upon a movable plate 56, which is adapted to be moved into engagement with an adjustment member 57 threadedly carried by an adjustment screw 58. The screw 58 is provided with two threaded sections, one of these sections being for the purpose of focusing of the camera lens, while the other section adjusts the member 53 in accordance with the focus. To this end, the latter threaded section of the screw carries a member 59 having a notch adapted to receive the hinged latch 60 pivotally carried by the member 53.

As the lens is adjusted by means of the screw 58 to focus the camera, the length of the bellows structures 54 and 55 is adjusted accordingly to vary the angle of the admitted light similarly to the light-admission angle of the lens. For example, it will be seen that adjustment of the lens backward will increase the light-admission angle of the lens so that the camera will be focused upon a larger area. If the light-admission angle of the light-responsive control device is not adjusted accordingly, the light-responsive control means may receive light from an area which is larger or smaller than the focused area, so that the light-responsive control may not be accurate. While in many cases, this variance is permissible, it is preferred to employ some means, such as that illustrated in Fig. 18, to eliminate the variance between the light-admission angle of the lens and the light-admission angle of the control device.

In the device of Fig. 18, the threaded sections of screw 58 are so arranged, and the bellows structures 54 and 55 are so designed, that the member 53 is adjusted in response to focusing movement of the lens in a manner to adjust the light-admission angle of the control device so that it corresponds to that of the lens.

With reference to the invention generally, it will be understood, of course, that diaphragms or other means may be provided to control the light admitted through the lens and the light admitted to the light-responsive device. Such diaphragms or means may be controlled jointly. As this is merely in the nature of an obvious possible refinement of the device, it has not been illustrated, it being desired to simplify as far as possible the illustration of the essential features of the invention to enable a clear understanding thereof.

The invention may be applied to various types of cameras. For example, it may be applied to an enlarging camera, in which case the shutter blades may be formed of orange colored transparent material. Such use may embody both time and instantaneous operation of the shutter mechanism, the shutter being maintained open to permit focusing of the negative and registration of the light conditions, and then being closed to set the needle and to permit proper placement of the enlarging paper. The orange colored light filtering through the closed shutter permits this. The shutter is then actuated to effect instantaneous exposure dependent upon the light conditions.

Although certain specific forms of the invention have been illustrated and described for the purpose of disclosure, it will be understood that the invention is not thus limited and may take various other forms while still retaining the essential principles as herein set forth. The light-responsive control device may be associated with camera shutter mechanisms or light-admission devices other than that illustrated on the drawings and the light-responsive device may take forms other than that of Fig. 18 to provide for adjustment of the light-admission angle in accordance with the focusing.

I claim:

1. In a photographic device, a movable member, means for positioning said member according to prevailing light intensity, a second movable member adapted to move toward and engage said first member, a shutter mechanism including a spring normally holding the shutter in closed position, manually-operable means for opening said shutter mechanism, means for latching the shutter in open position, means operative to move said second member toward said first member when said shutter mechanism is opened, means operative to hold said first member stationary when said shutter mechanism is opened, and means for releasing said shutter-latching means to close said shutter mechanism when said second member engages said first member.

2. In a photographic device, a movable member, means for positioning said member according to prevailing light intensity, a second movable member adapted to move toward and engage said first member, a shutter mechanism including a spring normally holding the shutter in closed position, manually-operable means for opening said shutter mechanism, means for latching the shutter in open position, means operative to move said second member toward said first member when said shutter mechanism is opened, manually-adjustable means for varying the rate of movement of said second member, means operative to hold said first member stationary when said shutter mechanism is opened, and means for releasing said shutter-latching means to close said shutter mechanism when said second member engages said first member.

3. In a photographic device, a movable member, means for positioning said member according to prevailing light intensity, indicating means associated with said member for indicating proper time exposures, a second movable member adapted to move toward and engage said first member, a shutter mechanism including a spring normally holding the shutter in closed position, manually-operable means for opening said shutter mechanism, means for latching the shutter in open position means operative to move said second member toward said first member when said shutter mechanism is opened, means operative to hold said first member stationary when said shutter mechanism is opened, means for releasing said shutter-latching means to close said shutter mechanism when said second member engages said first member, and manually-operable means for rendering said holding means inoperative at will to permit manual operation of said shutter mechanism according to the time exposure indicated by said indicating means.

4. In a photographic device, a movable member, means for positioning said member according to prevailing light intensity, a second movable member adapted to move toward and engage said first member, spring-operated means for moving said second member toward said first member, latching means for normally holding said second member away from said first member, a shutter mechanism including a spring normally holding the shutter in closed position, manually-operable means for opening said shutter mechanism, means for latching the shutter in open position, means operable by said shutter-opening means for holding said first member stationary, means operable by said shutter-opening means for releasing said first-mentioned latching means, to thereby permit said spring-operated means to move said second member, and means for releasing said shutter-latching means when said second member engages said first member.

5. In a photographic device, a movable needle, means for positioning said needle according to prevailing light intensity, a pivoted lever adapted to move toward said needle and having an end portion adapted to engage said needle, spring-operated means for moving said pivoted lever toward said needle, latching means for normally holding said pivoted lever away from said needle, a shutter mechanism including a spring normally holding the shutter in closed position, manually-operable means for opening said shutter mechanism, means for latching the shutter in open position, means operable by said shutter-opening means for holding said needle stationary, and means operable by said shutter-opening means for releasing said first-mentioned latching means, to thereby permit said spring-operated means to move said pivoted lever, whereby the said end portion of said lever engages the stationary needle causing the lever to move about its pivot, the other end of said lever releasing said shutter-latching means when the lever moves pivotally.

6. In a photographic device, a movable needle, means for positioning said needle according to prevailing light intensity, indicating means associated with said needle for indicating proper time exposures, a pivoted lever adapted to move toward said needle and having an end portion adapted to engage said needle, spring-operated means for moving said pivoted lever toward said needle, latching means for normally holding said pivoted lever away from said needle, a shutter mechanism including a spring normally holding the shutter in closed position, manually-operable means for opening said shutter mechanism, means for latching the shutter in open position, means operable by said shutter-opening means for holding said needle stationary, means operable by said shutter-opening means for releasing said first-mentioned latching means, to thereby permit said spring-operated means to move said pivoted lever, whereby the said end portion of said lever engages the stationary needle causing the lever to move about its pivot, the other end of said lever releasing said shutter-latching means when the lever moves pivotally, and manually-operable means for rendering said needle-holding means inoperative at will to permit manual operation of said shutter mechanism according to the time exposure indicated by said indicating means.

7. In a photographic device, a movable member, means for positioning said member according to prevailing light intensity, a second movable member adapted to move toward and engage said first member, spring-operated means for moving said second member toward said first member, manually-adjustable means for varying the rate of movement of said second member, latching means for normally holding said second member away from said first member, a shutter mechanism including a spring normally holding the shutter in closed position, manually-operable means for opening said shutter mechanism, means for latching the shutter in open position, means operable by said shutter-opening means for holding said first member stationary, means operable by said shutter-opening means for releasing said first-mentioned latching means, to thereby permit said spring-operated means to move said second member, and means for releasing said shutter-latching means when said second member engages said first member.

8. In a photographic device, a movable member, means for positioning said member according to prevailing light intensity, a second movable member adapted to move toward and engage said first member, spring-operated means for moving said second member toward said first member, means for adjusting said spring-operated means to vary the rate of movement of said second member, latching means for normally holding said second member away from said first member, a shutter mechanism including a spring normally holding the shutter in closed position, manually-operable means for opening said shutter mechanism, means for latching the shutter in open position, means operable by said shutter-opening means for holding said first member stationary, means operable by said shutter-opening means for releasing said first-mentioned latching means, to thereby permit said spring-operated means to move said second member, and means for releasing said shutter-latching means when said second member engages said first member.

9. In a photographic device, a movable member, means for positioning said member according to prevailing light intensity, a second movable member adapted to move toward and engage said first member, spring-operated means for moving said second member toward said first member, dashpot means for retarding the movement of said second member, latching means for normally holding said second member away from said first member, a shutter mechanism including a spring normally holding the shutter in closed position, manually-operable means for opening said shutter mechanism, means for latching the shutter in open position, means operable by said shutter-opening means for holding said first member stationary, means operable by said shutter-opening means for releasing said first-mentioned latching means, to thereby permit said spring-operated means to move said second member, and means for releasing said shutter-latching means when said second member engages said first member.

10. In a photographic device, a movable member, means for positioning said member according to prevailing light intensity, indicating means associated with said member for indicating proper time exposures, a second movable member adapted to move toward and engage said first member, spring-operated means for moving said second member toward said first member, latching means for normally holding said second member away from said first member, a shutter mechanism including a spring normally holding the shutter in closed position, manually-operable means for opening said shutter mechanism, means for latching the shutter in open position, means operable by said shutter-opening means for holding said first member stationary, means operable by said shutter-opening means for releasing said first-mentioned latching means, to thereby permit said spring-operated means to move said second member, means for releasing said shutter-latching means when said second member engages said first member, and manually-operable means for rendering said holding means inoperative at will to permit manual operation of said shutter mechanism according to the time exposure indicated by said indicating means.

CONRAD J. LINKE.